No. 638,316. Patented Dec. 5, 1899.
E. C. BRIDGE.
OPTICAL APPLIANCE.
(Application filed June 10, 1898.)

(No Model.)

Witnesses
K. E. Klein.
C. H. McEwen.

Inventor
Ephraim C. Bridge
By W. W. Dudley & Co.
his Attorneys

THE NORRIS PETERS CO., PHOTO-LITHO., WASHINGTON, D. C.

United States Patent Office.

EPHRAIM C. BRIDGE, OF CHARITON, IOWA.

OPTICAL APPLIANCE.

SPECIFICATION forming part of Letters Patent No. 638,316, dated December 5, 1899.

Application filed June 10, 1898. Serial No. 683,079. (No model.)

*To all whom it may concern:*

Be it known that I, EPHRAIM C. BRIDGE, a citizen of the United States, residing at Chariton, in the county of Lucas and State of Iowa, have invented certain new and useful Improvements in Optical Appliances; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention is directed to improvements in devices for measuring optical defects or irregularities of the eye commonly known as "errors of refraction," and also for determining the character and strength of remedial lenses and for applying tests thereto while in use.

My invention contemplates the employment, in connection with an adjustable negative lens, of a plurality of converging lenses, whereby spherical aberration is corrected and the maximum of illumination obtained, and whereby also the light-rays are so disposed as to completely cover the cornea of the eye, thus rendering the device particularly adaptable for correcting presbyopia in addition to measuring other defects of sight.

Heretofore, so far as I am aware, in devices of this character no means have been devised which successfully overcome spherical aberration of the lens except at the expense of illumination. It has been proposed to employ a single lens in conjunction with a fixed negative lens, but with such an arrangement not only is spherical aberration present, but by reason of this defect a clear vision is not possible. My improved optical device is designed to accurately detect and record the extent of vision, the presbyopia, and astigmatism, and if the latter is present further adjustment will determine the kind and amount of astigmatism. It is also possible with my improved appliance to test glasses while in use by the patient and determine what changes, if any, are to be made therein. Moreover, it is possible with my device to detect and measure hypermetropia when presbyopia is absent.

The nature of my invention will be readily understood by reference to the following detailed description and to the accompanying drawings, in which—

Figure 1:
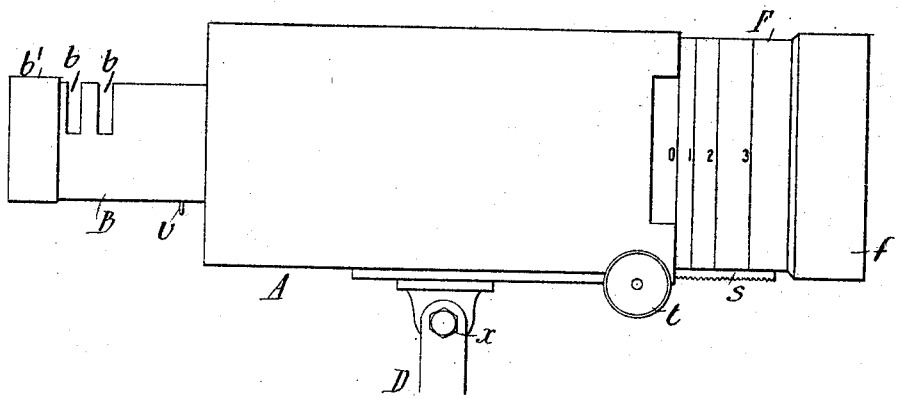
Figure 2:
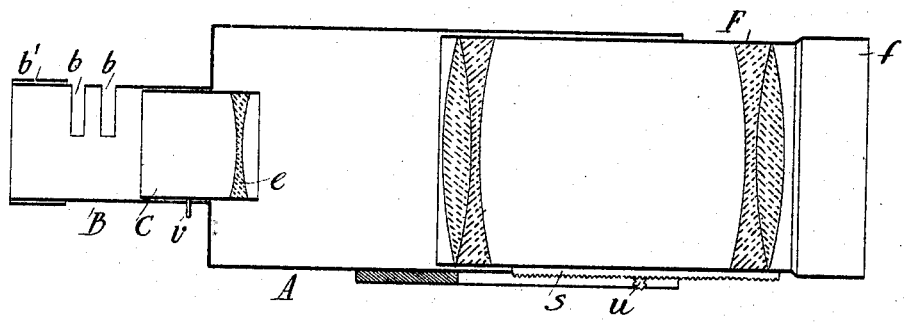
Figure 4:
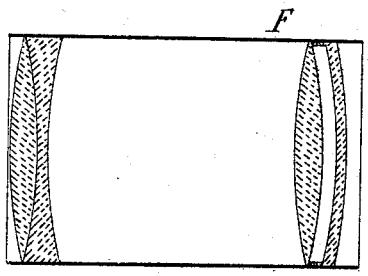
Figure 3:
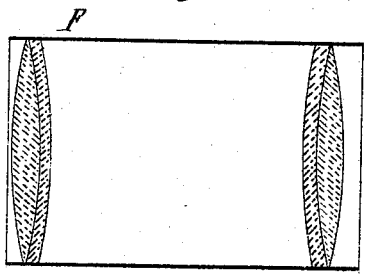

Figure 1 is a view in elevation of an optical appliance embodying my invention. Fig. 2 is a central sectional view. Figs. 3 and 4 are detail views of alternate forms of lenses for use in connection with my improved device.

Referring to the said drawings by letter, A denotes the main tube, B is a tube extension of the main tube, C is the draw-tube, and D is a standard on which the tubes are supported, a pivotal connection being made at $x$. The draw-tube C is slidably arranged in the tube extension B, and to permit of its manipulation a pin $v$ is provided on the tube C and projects through a slot in the extension. In one end of the draw-tube is a concave or negative lens $e$. In the upper side of the tube extension are slots $b\ b$ for test-lenses, and $b'$ is a sleeve for covering the slots when not in use. In the opposite end of the main tube is slidably arranged an inner tube F, which carries a combination of lenses, hereinafter referred to. This tube F is longitudinally adjusted through the employment of a pinion $u$, rotated by a hand-wheel $t$, the pinion engaging a rack-bar $s$, carried by the inner tube F. At the outer end of the tube F is a hood $f$.

I employ in connection with the inner tube F a plurality of converging lenses, Fig. 2, showing a combination of convexo-convex and concavo-concave lenses, and Figs. 3 and 4 showing, respectively, combinations of convexo-convex and concavo-convex lenses, and of convexo-convex, concavo-concave, and concavo-convex lenses. Each of the combinations shown minimizes spherical aberration and produces the maximum illumination, and, in conjunction with the negative lens, so disposes the light-rays as that the cornea of the applied eye is covered, the result being an absolute clear vision.

In connection with the inner slide-tube F, I employ a scale (see Fig. 1) by which the character of lens is determined. The measurement when made may be proven by a test of the glasses when worn, whereby absolute accuracy is obtained. In measuring presbyopia, for instance, the eye of the patient is applied to the device and the tube F is adjusted until the image is perfectly visible, and by reference to the scale the character of glass is at once determined, and this without regard to the age of the patient.

The negative lens is, as before stated, mounted in a draw-tube, which is manipulated from without by the pin $v$. An adjustment of this lens is necessary when a variation in the distance between the device and test object is made, the object being to insure accuracy of scale indications regardless of change of distance.

I claim as my invention—

In an optical instrument of the character described, the combination of a main tube provided toward one end with a relatively small slidable tube carrying a negative lens, and provided toward its other end with a relatively large slidable tube telescoping the main tube, means for effecting the adjustments of these slide-tubes, a plurality of converging lenses in the larger slide-tube, and an indicating-scale in connection with the latter tube and main tube.

In testimony whereof I affix my signature in presence of two witnesses.

EPHRAIM C. BRIDGE.

Witnesses:
JOHN CULBERTSON,
PETER E. VAIL.